United States Patent Office 3,781,237
Patented Dec. 25, 1973

---

3,781,237
USE OF A POLYSILOXANE TO ELIMINATE SURFACE FLAWS IN IMIDE AND AMIDE-IMIDE POLYMER FILMS
William M. Alvino and William R. Koryak, Pittsburgh, Pa., assignors to Westinghouse Electric Corporation, Pittsburgh, Pa.
No Drawing. Continuation-in-part of abandoned application Ser. No. 94,944, Dec. 3, 1970. This application July 13, 1972, Ser. No. 271,428
Int. Cl. C08g *41/04, 47/10*
U.S. Cl. 260—29.1 SB
12 Claims

ABSTRACT OF THE DISCLOSURE

A casting solution, comprising a solvent solution of an aromatic polyamic acid and an effective amount of a lower alkyl polyorganosiloxane, is applied as a wet film to a substrate and cured at an elevated temperature to provide defect free high temperature polyimide and polyamide-imide films.

CROSS-REFERENCE TO RELATED APPLICATIONS

The present application is a continuation-in-part application of application U.S. Ser. No. 94,944, filed on Dec. 3, 1970, now abandoned.

BACKGROUND OF THE INVENTION

Many imide and amide-imide polymers have been synthesized, but not all of them are good film formers. Of those that can be cast into films, only some exhibit the desired properties required of what is termed an excellent film former.

There is a need, therefore, for a simple and easy method of preparing polyimide and polyamide-imide films, free from surface defects such as dimpling, fish eyes, orange peel and pock marks. Such a method could, for example, provide polyimide and polyamide-imide film strips useful as high temperature insulation on a wide variety of electrical apparatus.

SUMMARY OF THE INVENTION

Our invention relates to a new and improved method of preparing polyimide and polyamide-imide polymer films that overcomes prior art difficulties in successfully casting these polymers.

We have found that incorporation of a particular, compatible, lower alkyl polyorganosiloxane, in small amounts, into a solution of polyimide and polyamide-imide precursors, to provide a casting solution, solved flow and leveling problems while casting and provided cast polyimide and polyamide-imide films free from surface defects

DESCRIPTION OF THE PREFERRED EMBODIMENTS

One of the imide and amide-imide films, cast from solutions in accordance with this invention, comprises polymers of aromatic polyimides or aromatic polyamide-imides having the recurring unit:

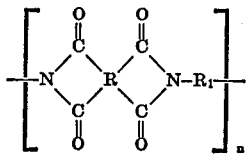

wherein $n$ is at least 15, R is at least one tetravalent organic radical selected from the group consisting of:

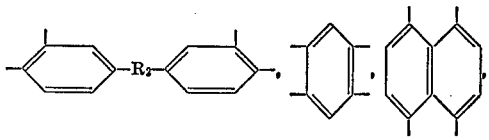

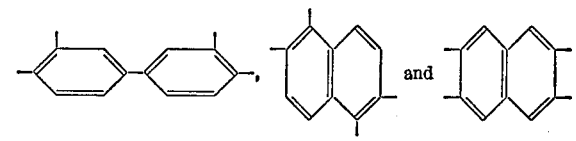

$R_2$ being selected from the group consisting of divalent aliphatic hydrocarbon radicals having from 1 to 4 carbon atoms and carbonyl, oxy, sulfo and sulfonyl radicals and in which $R_1$ is at least one divalent radical selected from the group consisting of:

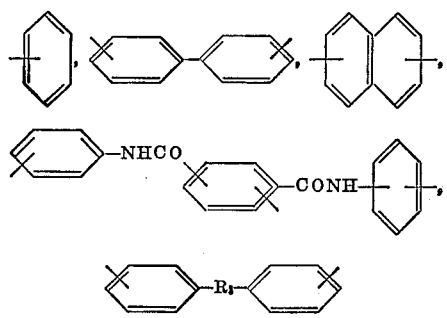

in which $R_3$ is a divalent organic radical selected from the group consisting of $R_2$, silico and amido radicals. Polymers containing two or more of the R and/or $R_1$ radicals, especially multiple series of $R_1$ containing amido radicals, are particularly valuable in some instances.

The aromatic polyamide-imide resins, represented by certain of the foregoing formulae are described and claimed in U.S. Pat. 3,179,635, assigned to the assignee of this invention, and reference may be made thereto for details on the methods of preparing those resins. For additional details reference may also be made to an article by Frost and Bower, entitled, "Aromatic Polyimides," in J. Polymer Science, Part A, vol. 1, pp. 3135–3150 (1963). Reference may be had to U.S. Pats. 3,179,631; 3,179,632; 3,179,633 and 3,179,634 for details on preparing aromatic polyimide resins.

The described essentially insoluble solid resinous films are derived from certain soluble aromatic polyamic acids in solvent solution. The wet film after being cast or otherwise applied to a suitable substrate is heated to drive off the solvent and to cure the precursor film to its solid resinous state.

In general, the soluble polyamic acid precursors are prepared by admixing a suitable aromatic tetracarboxylic dianhydride with an aromatic diamine in a suitable solvent at room temperature. The admixture or solution is stirred until a maximum viscosity is reached. Examples of suitable dianhydrides are pyromellitic dianhydride, benzophenone tetracarboxylic dianhydride naphthalene tetracarboxylic dianhydride and the like.

Examples of suitable diamines are m-phenylene diamine, methylene dianiline, diaminodiphenyl ether, diaminobenzanilide and the like.

The same general procedure is employed when a derivative of an aromatic tricarboxylic anhydride, e.g. trimellitic anhydride chloride or the ester diacid chloride of trimellitic anhydride is used in place of the aforesaid aromatic dianhydride. The above-named diamines are, of course, also suitable for use with the tricarboxylic anhydride derivatives. References which describe the procedure in greater detail are U.S. Pat. 3,179,635, assigned to the assignee of this invention, and U.S. Pats. 3,179,614; 3,179,631; 3,179,632; 3,179,633 and 3,179,634.

One of the aromatic polyamic acids suitable for use as a precursor in this invention has the recurring unit:

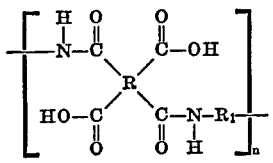

in which $n$ is at least 15 and R and $R_1$ are identical to the description hereinabove relating to the solid aromatic polyimide and polyamide-imide resins. It should be understood that suitable polyamic acids may also contain two or more of the R and/or $R_1$ radicals.

Suitable solvents for the aromatic polyamic acids are, for example, the normally liquid organic solvents of the N,N-dialkylcarboxylamide class, preferably the lower molecular weight members of this class. Typical examples include dimethyl acetamide, dimethyl formamide, N-methyl pyrrolidone, as well as dimethyl sulfoxide and pyridine. The solvents can be used individually in combinations of two or more, or in combination with other liquid organic solvents such for example, as xylene, toluene, benzene, benzonitrile, dioxane, butyrolactone, and cyclohexane. The solvents are easily removed by heating in a drying tower or oven, so that the condensation reaction which takes place in converting the polyamic acid precursors to the solid resin may be immediately initiated in the heated curing tower. The precursor solutions are all highly viscous and rather low polyamic acid solids concentrations, up to about 35% by weight, are recommended if reasonable fluid solutions are desired for casting purposes. This will provide precursor solutions having viscosities between about 600–7000 centipoise.

In addition to the aforementioned aromatic polyimide and polyamide-imide recurring unit wherein R was a tetravalent organic, radical, other resins which are particularly suitable as films which can be cast from solutions in accordance with this invention are derived from a trivalent anhydride and have the structure:

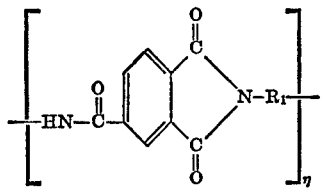

wherein $R_1$ and $n$ are identical to the description hereinabove relating to the solid aromatic polyimide and polyamide-imide resins.

A particularly valuable film is provided when $R_1$ is

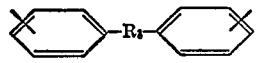

and $R_3$ is an oxy radical. This resin has the recurring unit:

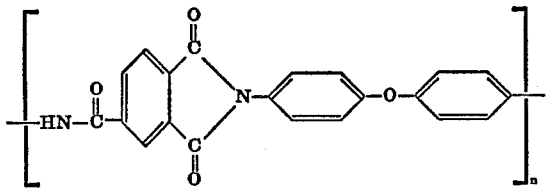

The soluble precursors for the above trivalent derived polyamide-imide resins may be generically described as aromatic polyamic or polyamide acids and include in repeating form one or both of the structures:

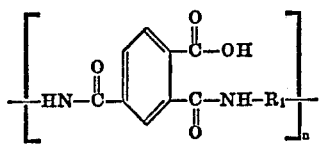

and

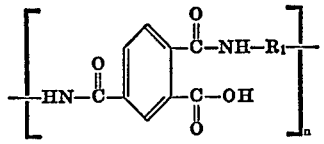

wherein $R_1$ and $n$ are identical to the description hereinabove. For details on the preparation of these soluble polyamic acids and the solid resins therefrom, reference may be had to British Pat. 1,056,564.

The same solvents as previously described can be used for the above aromatic polyamic acids.

The additives that are compatible with solutions of all of the heretofore described aromatic polyamic acids, to provide useful and superior film forming solutions and defect free cast films, are of the class of lower alkyl polyorgano siloxane materials. When particular additives of this class are added to the polyamic acid solution in effective amounts, they provide a more easily cast, flowable solution, than those without additives. The additive provided solutions with reduced surface tension which enabled the solvent to evaporate from the wet film more uniformly.

Polymers in which the main chain consists of repeating

groups together with predominantly organic side groups are referred to as polyorganosiloxanes. The polyorganosiloxanes are generally prepared by reacting chlorosilanes with water to give hydroxyl compounds which then condense to give the repeating polymer structure, e.g.

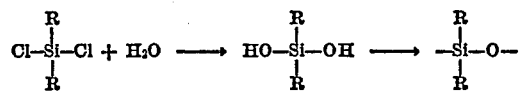

This provides a difunctional material. Trifunctional materials can similarly be prepared by hydrolysis of a trichlorosilane, e.g.

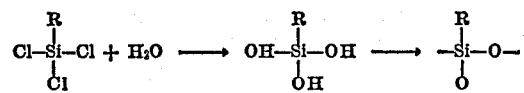

These polymers are well known in the art. A complete description of methods for making polyorganosiloxanes and polysiloxane resins can be found in U.S. Pats. 2,382,082; 2,389,477 and 2,398,672 and Byrdson, Plastics Materials (1966), chapter 25, herein incorporated by reference.

Particular lower alkyl polyorganosiloxanes having the structural formula:

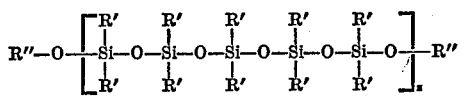

wherein R' is selected from the group consisting of $CH_3$, $OCH_3$, $C_2H_5$ and R" is $CH_3$, so that the ratio of the $CH_3$, $OCH_3$ and $C_2H_5$ groups bonded to Si, i.e., $$CH_3:OCH_3:C_2H_5$$

is about 8:2:1, are the compatible additives which provide the polyamic acid solutions with excellent casting properties. These additives have repeating

groups, with $CH_3$, $OCH_3$ and $C_2H_5$ groups attached to the Si, such that there is a ratio of about eight $CH_3$ groups and two $OCH_3$ groups, for each $C_2H_5$ group. The average value of z above is between about 1 to 30 and need not be a whole number.

Suitable solvents for the above described lower alkyl polyorganosiloxane include all of the solvents previously described as suitable for the aromatic polyamic acids and preferably toluene, xylene, and mineral spirits or ketones.

This particular compatible lower alkyl polyorganosiloxane is commercially available at a 10% polyorganosiloxane solids in toluene solution from Dow Corning Corporation under the proprietary designation Dow Corning 6 paint additive solution. This provides an additive solution compatible with solutions of the aromatic palyamic acids heretofore described, and when added in small effective amounts, provides imide and amide-imide casting solutions having uniform drying properties and reduced surface striations and orange peel when cast as film.

The above described lower alkyl polyorganosiloxanes can be added in solid form to the aromatic polyamic acid solution or as a solvent solution.

When the polyorganosiloxane is added in solid form to the polyamic acid solution, the lower alkyl polyorganosiloxane is present preferably in a polyorganosiloxane solids; aromatic polyamic acid solids weight ratio range of between about 1:20,000 to 1:1,000 although the weight ratio range can be up to 1:400 (i.e. 1 part by weight solid polyorganosiloxane to 400 parts by weight solid aromatic polyamic acid.).

The weight percent range of solid polyorganosiloxane based on aromatic polyamic solids would be between about 0.005 to 0.1% by weight although the range can be up to 0.25% by weight. When more solid polyorganosiloxane is added then the above ratio of 1 part per 400 parts solid polyamic acid or 0.25% by weight based on polyamic acid solids, a compatibility problem begins to develop which results in defective films. When less solid polyorganosiloxane is added then the above ratio of 1 part per 20,000 parts polyamic acid or 0.005% by weight based on polyamic acid solids, the additive is ineffective to provide good casting solutions or reduce film surface flaws.

When the polyorganosiloxane is added as a commercially available additive solvent solution of 10% solids, the additive solution could constitute up to about 2.5% by weight but preferably from about 0.05 to 1% by weight based on aromatic polyamic acid solids in solution.

In accordance with this invention, the solvent solution of aromatic polyamic acid and lower alkyl polyorganosiloxane is applied by dipping, brushing, spraying, but preferably casting as a thin wet film to one or both sides of a suitable substrate to form a film substrate composite. The composite is then heated in a tower or oven to eliminate or drive off the solvent or solvents and cure the precursor film to a solid polyimide or polyamide-imide high temperature film. Temperatures may range from about 100° C. to 300° C. and curing times from about 15 minutes to 1 hour.

The film can be applied to a variety of substrates such as copper, steel or aluminum foil of 1 mil to 15 mil thickness or glass plates from which the film can be stripped to provide a free insulation.

EXAMPLE 1

A polyamic acid precursor solution was formed by dissolving the resin powder obtained from equimolar quantities of 4-acid chloride of trimellitic anhydride and metaphenylene diamine in dimethyl acetamide as solvent, to give a solution having a solids content of 32% and a viscosity of about 1080 centipoise at 25° C.

EXAMPLE 2

A polyamic acid precursor solution was formed by the reaction of equimolar quantities of benzophenone tetracarboxylic dianhydride and 4,4' - diamino diphenyl ether in dimethyl acetamide as solvent, to give a 16% solids solution having a viscosity of about 1300 centipoise at 25° C.

EXAMPLE 3

A polyamic acid precursor solution was formed by the reaction of equimolar quantities of 4-acid chloride of trimellitic anhydride and 4,4'-diamino diphenyl ether in dimethyl acetamide as solvent, to give a 20–22.5% solids solution having a viscosity of about 2500 centipoise at 25° C.

EXAMPLE 4

To 260 grams of the polyamic acid precursor solution of Example 1 (32% solids in dimethyl acetamide, i.e., 83 grams aromatic polyamic acid in solution) was added 0.083 gram of Dow Corning 6 paint additive solution (0.1 weight percent solution based on aromatic polyamic acid solids or a solid polyorganosiloxane solid aromatic polyamic acid weight ratio range of 1:10,000). This additive is a 10% solids in toluene solution and contained 0.0083 gram of solid lower alkyl polyorganosiloxanes having the approximate structural formula:

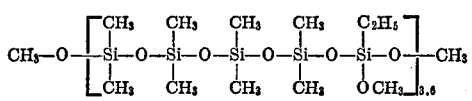

The $CH_3$, $OCH_3$ and $C_2H_5$ groups are bonded to silicon in the ratio of about 8:2:1, the number average molecular weight ($M_n$) is about 1472, and the number of repeating units, is between about 3–4. The additive solution had a specific gravity of 0.889 at 77° F., a viscosity of 1.04 centistokes at 77° C. and an open cup flash point of 60° F.

The solutions were mixed thoroughly to give a flowable more easily cast solution than those without additive. The additive solution had reduced surface tension which enabled the solvent to evaporate from the wet film more unfiormly than those without additive. A small amount of the casting solution was poured onto a glass plate and films were cast using a film applicator with a wet film gap setting of 20 mil (0.020"). The films were cured in an oven for 15 minutes at 100° F., 15 minutes at 165° C. and a final 10 minutes at 200° C. The resulting polyamide-imide films were about 3 mils thick, were free from orange peeling, dimpling and pock marks and exhibited good crease and tear resistance. Polyorganosiloxanes, as represented above, having much higher numbers of repeating units should also work.

Films were also cast and cured as above from the polyamic acid precursor solution of Example 1, not containing the Dow Corning 6 paint additive solution. These films showed pronounced surface defects ranging from severe orange peeling to pock marking and dimpling. Without the additive the solution did not have the flow and leveling properties of a good casting solution and there was separation of the resin solution to leave voids in the wet film prior to curing.

EXAMPLE 5

To 245 grams of the polyamic acid precursor solution of Example 2 (16% solids in dimethyl acetamide) was added 0.039 gram of Dow Corning 6 paint additive solution (0.1 weight percent solution based on aromatic polyamic acid solids).

The solutions were mixed thoroughly to give a flowable casting solution. A small amount of the casting solution was poured onto a glass plate and films were cast using a film applicator with a wet film gap setting of 20 mils. The films were cured in an oven for 10 minutes at 100° C., 15 minutes at 170° C. and a final 15 minutes at 275° C. The resulting polyimide films were about 3 mils thick, were free from orange peeling, dimpling and pock marks and exhibited good crease and tear properties.

In order to determine if the additive had any serious effect on the mechanical properties of the films, several films were also cast and cured as above from the polyamic acid precursor solution of Example 2 not containing the Dow Corning 6 paint additive. These films were tested and gave the following results:

TABLE I

| Sample film | Tensile strength, p.s.i. | Elongation, percent | Tensile modulus, p.s.i. |
|---|---|---|---|
| Polyimide (with additive) | 15,866 | 5.4 | $0.47 \times 10^6$ |
| Polyimide (without additive) | 15,966 | 6.9 | $0.46 \times 10^6$ |

The mechanical properties shown in Table I do not indicate any deleterious effect by the incorporation of this additive.

EXAMPLE 6

To two 100-gram samples of the polyamic acid precursor solution of Example 3 (20% solids in dimethyl acetamide) was added 0.02 and 0.2 gram of Dow Corning 6 pain addiive soluion (0.1 and 1.0 weigh percen solution based on aromatic polyamic acid solids).

The solutions were mixed thoroughly to give two flowable casting solutions. A small amount of each casting solution was poured onto a glass plate and films were cast using a film application with a wet film gap setting of 25 mils. The films were cured in an oven for 15 minutes at 100° C. and for 15 minutes at 160° C. The resulting polyamide-imide films were about 2.5 mils thick, were free from orange peeling, dimpling and pock marks and exhibited good crease and tear properties.

EXAMPLE 7

To 260 grams of the polyamic acid precursor solution of Example 1 (32% solids in dimethyl acetamide) was added 8.3 grams of Dow Corning 6 paint additive solution (10 weight percent solution based on aromatic polyamic acid solids or a solid polyorgosiloxane:solid aromatic polyamic acid weight ratio range of 1:100).

The solutions were mixed thoroughly to give a flowable casting solution. A small amount of the casting solution was poured onto a glass plate and films were cast using a film applicator with a wet film gap setting of 20 mils. The films were cured in an oven for 10 minutes at 100° C., 15 minutes at 170° C. and a final 15 minutes at 275° C. Although there were no voids in the resulting polyamide-imide films they were translucent indicating incompatibility of the additive with the polyamide-imide resin polymer at this extremely high additive amount.

EXAMPLE 8

To two 50-gram samples of the polyamic acid precursor solution of Example 3 (22.5% solids in dimethyl acetamide) was added 0.012 and 0.059 gram of Dow Corning 11 paint additive solution (0.11 and 0.52 weight percent solution based on aromatic polyamic acid solids). This additive solution is a 10% solids in toluene solution of a silicone glycol copolymer. The additive solution had a specific gravity of 0.878 at 77° F. and a viscosity of 2.0 centistokes at 77° F.

The two solutions were mixed thoroughly to give two casting solutions. A small amount of each casting solution was poured onto a glass plate and films were cast using a film applicator with a wet film gap setting of 20 mils. The films were cured in an oven for 15 minutes at 100° C., 15 minutes at 165° C. and a final 10 minutes at 200° C. The resulting polyamide-imide films, containing the Dow Corning 11 paint additive solution, did not have pock marks or voids but were hazy and almost opaque after cure, indicating that this additive was incompatible with the resin polymer even at very low amounts.

EXAMPLE 9

To three 50-gram samples of the polyamic acid precursor solution of Example 3 (22.5% solids in dimethyl acetamide) was added 0.005, 0.011 and 0.030 gram of Dow Corning 200 fluid additive solution respectively (0.05, 0.10 and 0.27 weight percent solution respectively based on aromatic polyamic acid solids). This additive solution is a dimethylpolysiloxane fluid. The additive solution had a viscosity of 350 centistokes at 77° F.

The three solutions were mixed thoroughly to give three casting solutions. A small amount of each casting solution was poured onto a glass plate and films were cast using a film applicator with a wet film gap setting of 20 mils. The films were cured in an oven for 15 minutes at 165° C. and a final 10 minutes at 200° C., the resulting polyamide-imide films, containing the Dow Corning 200 fluid additive solution, contained voids and were cloudy after cure, indicating that this additive was also incompatible with the resin polymer even at very low amounts.

These examples indicate that only particular lower alkyl polyorganosiloxane additives heretobefore described are compatible with the particular resin systems described herein, in small amounts, to give new and improved polyimide and polyamide-imide casting solutions that are useful in casting thin, high temperature insulating films. Other additives having approximate repeating units such as:

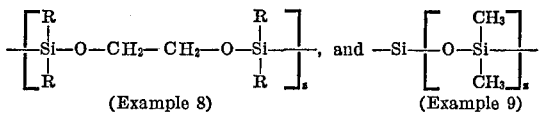

(Example 8)     (Example 9)

do not seem to be compatible with the particular resin systems described herein. Although the exact chemical reason for this compatibility is not known at this time, we do know that the addition of small amounts of the particular lower alkyl polyorganosiloxane additive heretofore described solves prior art polyimide and polyamide-imide film casting problems.

We claim as our invention:

1. A casting solution consisting essentially of
(I) a solvent solution of
  (A) an aromatic polyamic acid selected from the group consisting of acids having the structure:

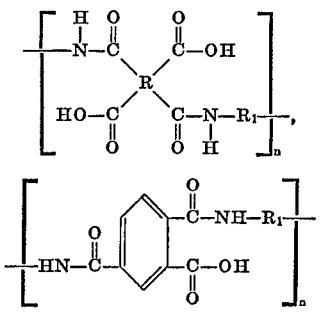

and

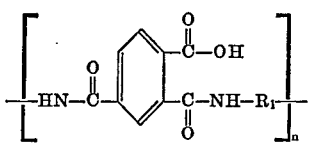

wherein $n$ is at least 15, R is at least one tetravalent organic radical selected from the group consisting of:

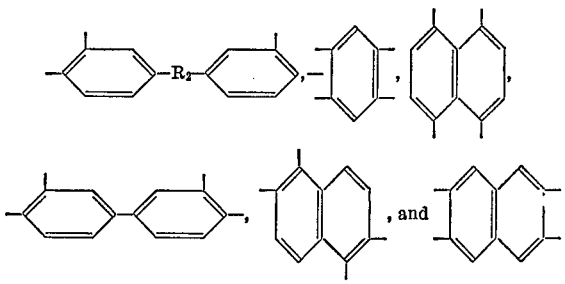

$R_2$ being selected from the group consisting of divalent aliphatic hydrocarbon radicals having from 1 to 4 carbon atoms and carbonyl, oxy, sulfo and sulfonyl radicals and in which $R_1$ is at least one divalent radical selected from the group consisting of:

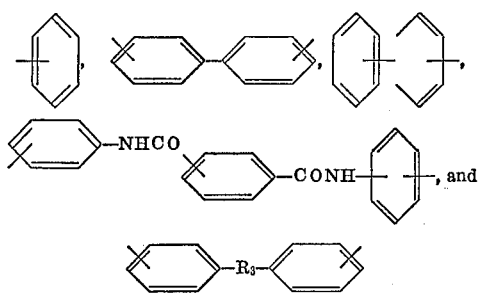

in which $R_3$ is a divalent organic radical selected from the group consisting of $R_2$, silico and amido radicals, and
(B) a lower alkyl polyorganosiloxane having the structure:

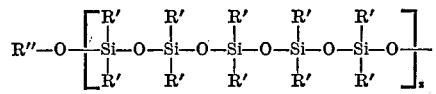

wherein $z$ is between about 1 to 30, R' is selected from the group consisting of $CH_3$, $OCH_3$ and $C_2H_5$ and R" is $CH_3$ so that the ratio of $CH_3:OCH_3:C_2H_5$ is about 8:2:1; the lower alkyl polyorganosiloxane being present in a solid polyorganosiloxane solid aromatic polyamic acid weight ratio range of between about 1:20,000 to 1:400.

2. The casting solution of claim 1 wherein the solvent comprises a solvent selected from the group consisting of dimethyl acetamide, dimethyl formamide, N-methyl pyrrolidone, dimethyl sulfoxide, pyridine and mixtures thereof.

3. The casting solution of claim 2 also containing a solvent selected from the group consisting of xylene, toluene, benzene, benzonitrile, dioxane, butyrolactone and cyclohexane.

4. The casting solution of claim 1 wherein the lower alkyl polyorganosiloxane is present in a polyorganosiloxane aromatic polyamic acid weight ratio range of between about 1:20,000 to 1:1,000.

5. The casting solution of claim 4 wherein the aromatic polyamic acid is selected from the group consisting of acids having the structure:

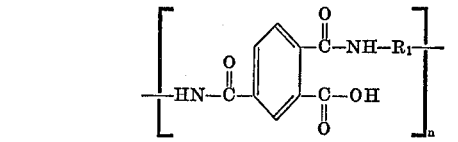

and

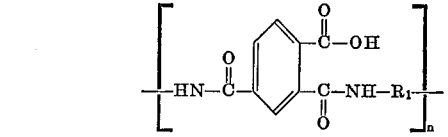

wherein $n$ is at least 15, $R_1$ is

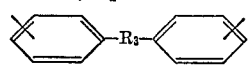

and $R_3$ is an oxy radical.

6. A method of producing a high temperature insulating film free from surface defects comprising a resin selected from the group consisting of aromatic polyimide and aromatic polyamide-imide comprising the steps:
(I) admixing:
(A) a solvent solution of an aromatic polyamic acid selected from the group consisting of acids having the structure:

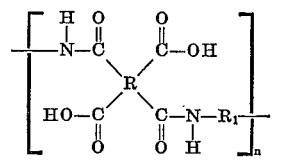

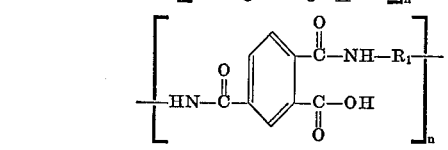

and

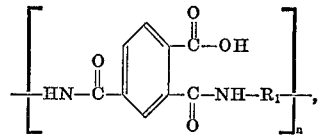

wherein $n$ is at least 15, R is at least one tetravalent organic radical selected from the group consisting of:

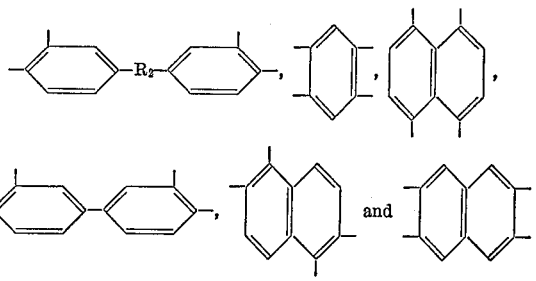

$R_2$ being selected from the group consisting of divalent aliphatic hydrocarbon radicals having from 1 to 4 carbon atoms and carbonyl, oxy, sulfo and sulfonyl radicals and in which $R_1$ is at least one divalent radical selected from the group consisting of:

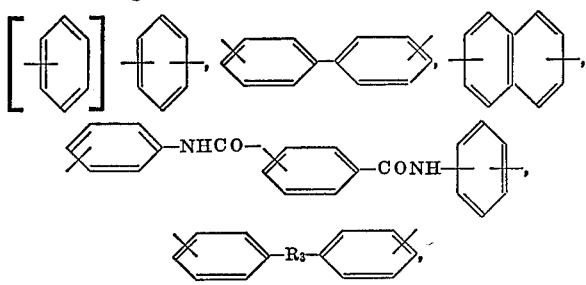

in which $R_3$ is a divalent organic radical selected from the group consisting of $R_2$, silico and amido radicals, and (B) a lower alkyl polyorganosiloxane effective to reduce the surface tension and increase the flowability of the polyamic acid solvent solution, said polyorganosiloxane having the structure:

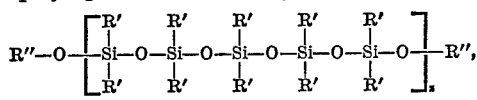

wherein $z$ is between about 1 to 30, $R'$ is selected from the group consisting of $CH_3$, $OCH_3$, and $C_2H_5$ and $R''$ is $CH_3$ so that the ratio of $$CH_3:OCH_3:C_2H_5$$

is about 8:2:1, the lower alkyl polyorganosiloxane being present in a solid polyorganosiloxane:solid aromatic polyamic acid weight ratio range of between about 1:20,000 to 1:400, and then
(II) applying a wet film of the admixture to a substrate to form a wet film substrate composite, and then
(III) heating the wet film substrate composite to uniformly evaporate solvent and cure the film to a solid resinous state free from surface defects.

7. The method of claim 6 wherein the solvent comprises a solvent selected from the group consisting of dimethyl acetamide, dimethyl formamide, N-methyl pyrrolidone, dimethyl sulfoxide, pyridine and mixtures thereof and the film is cast in Step (II).

8. The method of claim 7 wherein the solvent solution also contains a solvent selected from the group consisting of xylene, toluene, benzene, benzonitrile, dioxane, butyrolactone and cyclohexane.

9. The method of claim 7 where as a final step the cured film is stripped from the substrate.

10. The method of claim 7 wherein the film is heated at temperatures between about 100° C. to about 300° C. for about 15 minutes to about 1 hour in Step (III), the substrate is selected from the group consisting of copper, steel and aluminum foil and the polyamic acid solvent solution has a viscosity between about 600 cps. to about 7000 cps.

11. A high temperature insulating film consisting essentially of the cured reaction product of a solvent solution of:
(A) an aromatic polyamic acid selected from the group consisting of acids having the structure:

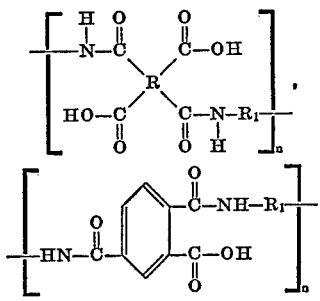

and

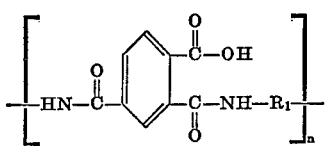

wherein $n$ is at least 15, R is at least one tetravalent organic radical selected from the group consisting of:

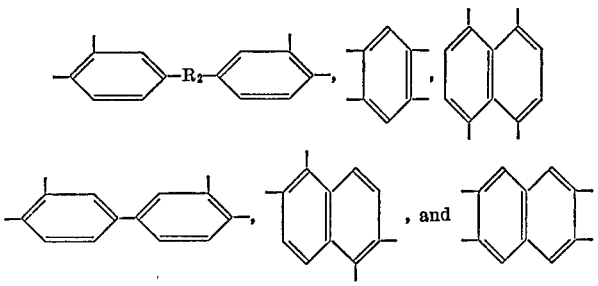

$R_2$ being selected from the group consisting of divalent aliphatic hydrocarbon radicals having from 1 to 4 carbon atoms and carbonyl, oxy, sulfo and sulfonyl radicals and in which $R_1$ is at least one divalent radical selected from the group consisting of:

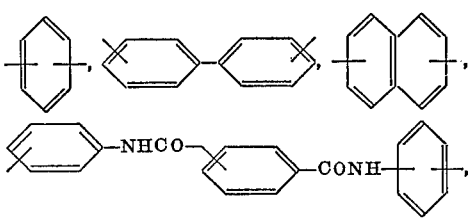

and

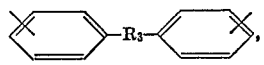

in which $R_3$ is a divalent organic radical selected from the group consisting of $R_2$, silico and amido radicals, and (B) a lower alkyl polyorganosiloxane having the structure:

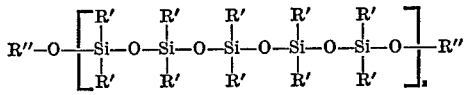

wherein $z$ is between about 1 to 30, $R'$ is selected from the group consisting of $CH_3$, $OCH_3$ and $C_2H_5$ and $R''$ is $CH_3$ so that the ratio of $CH_3:OCH_3:C_2H_5$ is about 8:2:1; the lower alkyl polyorganosiloxane being present in a solid polyorganosiloxane:solid aromatic polyamic acid weight ratio of between about 1:20,000 to 1:400, said film being characterized by a defect free surface.

12. The film of claim 11 on a substrate selected from the group consisting of copper, steel and aluminum foil.

References Cited
UNITED STATES PATENTS

| | | | |
|---|---|---|---|
| 3,632,440 | 1/1972 | Preston | 117—218 |
| 3,440,203 | 4/1969 | Boldebuck | 260—33.4 |
| 3,179,634 | 4/1965 | Edwards | 260—78 |
| 2,389,477 | 11/1945 | Wright | 260—2 |

MORRIS LIEBMAN, Primary Examiner

R. ZAITLEN, Assistant Examiner

U.S. Cl. X.R.

260—32.6 NT, 33.4 SB, 824 R, 857 PI